(12) United States Patent
Fisser et al.

(10) Patent No.: US 10,300,548 B2
(45) Date of Patent: May 28, 2019

(54) POWDER BUILD UNIT, CORRESPONDING DEVICE, AND METHOD EMPLOYING A POWDER BUILD UNIT

(71) Applicant: MTU Aero Engines AG, Munich (DE)

(72) Inventors: Maximilian Fisser, Tegernsee (DE); Georg Schlick, Munich (DE)

(73) Assignee: MTU Aero Engines AG, Munich (DE)

( * ) Notice: Subject to any disclaimer, the term of this patent is extended or adjusted under 35 U.S.C. 154(b) by 6 days.

(21) Appl. No.: 15/010,642

(22) Filed: Jan. 29, 2016

(65) Prior Publication Data

US 2016/0221100 A1 Aug. 4, 2016

(30) Foreign Application Priority Data

Feb. 3, 2015 (DE) .................. 10 2015 201 796

(51) Int. Cl.
| | |
|---|---|
| *B23K 9/04* | (2006.01) |
| *B22F 3/105* | (2006.01) |
| *B23K 9/26* | (2006.01) |
| *B29C 64/153* | (2017.01) |
| *B29C 64/20* | (2017.01) |

(52) U.S. Cl.
CPC .............. *B23K 9/04* (2013.01); *B22F 3/1055* (2013.01); *B23K 9/26* (2013.01); *B29C 64/153* (2017.08); *B29C 64/20* (2017.08); *B22F 2003/1056* (2013.01); *B22F 2003/1057* (2013.01); *Y02P 10/295* (2015.11)

(58) Field of Classification Search
CPC ...... B22F 2003/1056; B22F 2003/1057; B22F 3/1055; B29C 67/0077; B29C 67/0085

USPC .......... 219/76.15, 76.11; 419/50, 51, 52, 53; 427/532
See application file for complete search history.

(56) References Cited

U.S. PATENT DOCUMENTS

| | | | | |
|---|---|---|---|---|
| 5,403,540 | A * | 4/1995 | Brundage | H05B 6/106 219/602 |
| 6,250,522 | B1 * | 6/2001 | Carter, Jr. | B22D 23/10 222/594 |
| 9,751,260 | B2 * | 9/2017 | Dietrich | B22F 3/1055 |
| 2009/0068376 | A1 * | 3/2009 | Philippi | B29C 67/0085 427/532 |
| 2012/0007708 | A1 * | 1/2012 | Holcomb | H02K 99/10 336/195 |
| 2015/0123680 | A1 * | 5/2015 | Rosenau | G01D 5/20 324/654 |
| 2015/0246414 | A1 * | 9/2015 | Hess | B22F 3/1055 219/76.14 |

(Continued)

FOREIGN PATENT DOCUMENTS

| | | |
|---|---|---|
| DE | 102005025199 A1 | 12/2006 |
| DE | 102005022308 B4 | 3/2007 |

(Continued)

*Primary Examiner* — Dana Ross
*Assistant Examiner* — Joe E Mills, Jr.
(74) *Attorney, Agent, or Firm* — Barlow, Josephs & Holmes, Ltd.

(57) ABSTRACT

A powder build unit for a device for the additive manufacture of components, includes at least one electric lead and having at least one power source that is connected to the electric lead. The electric lead functions as a powder distributor and as a heating element. In addition, a device that contains this powder build unit, as well as a corresponding method of using the powder build unit, is disclosed.

16 Claims, 2 Drawing Sheets

(56) References Cited

U.S. PATENT DOCUMENTS

Figure 1:
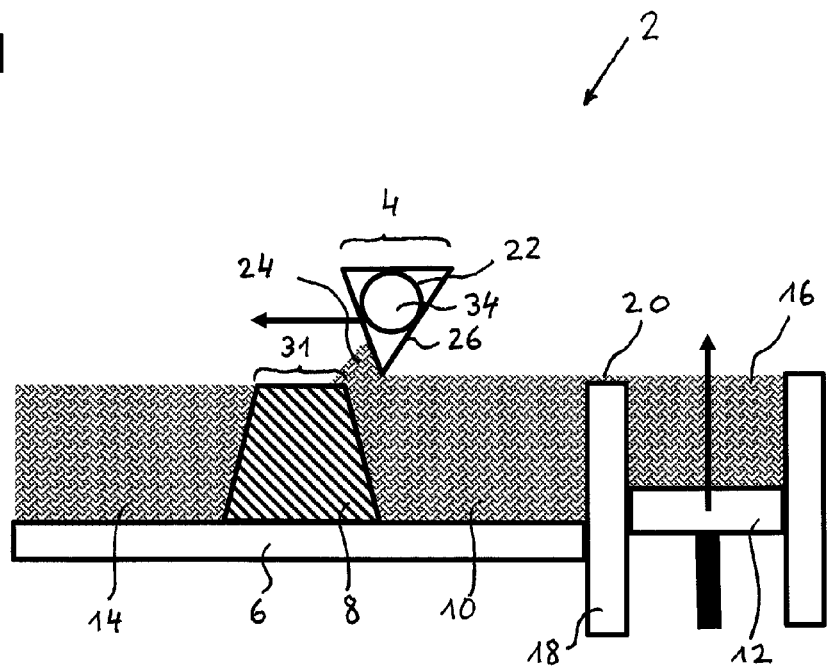

2016/0332371 A1* 11/2016 Staroselsky ......... B29C 67/0077

FOREIGN PATENT DOCUMENTS

| DE | 102010050711 A1 | 5/2012 |
| DE | 102014108081 A1 | 12/2014 |

* cited by examiner

POWDER BUILD UNIT, CORRESPONDING DEVICE, AND METHOD EMPLOYING A POWDER BUILD UNIT

BACKGROUND OF THE INVENTION

The invention relates to a powder build unit, a corresponding device that comprises this powder unit, and a method that employs the powder build unit according to the invention.

Additive or generative manufacture is known under various names, most of which are trade names of machine manufacturers or research institutions. These names include selective laser melting (SLM), direct metal laser sintering (DMLS), laser powder bed (LPB), and laser cusing (laser beam melting).

The method includes the selective melting of a powder layer deposited on a platform by means of a laser or electron beam. Afterward, the platform is lowered and another powder layer is deposited. The method is repeated until an adequate number of layers have been formed in order to generate a complete three-dimensional object.

For deposition of the powder on the platform, a coater is moved transversely across the platform and pushes a mound of powder in front of it. The coater is at a certain distance from the preceding powder layer. Typically, doctor blades or brushes are employed as coaters. In these methods of manufacture based on powder beds, the surface roughness depends on, among other factors, the particle diameters. The smaller the particle size is, the lesser is the surface roughness of the manufactured component. However, a metal powder with smaller particle diameters is hygroscopic; that is, moisture, in particular water, from the surroundings is bound on the surfaces of the particles. As a result, the powder forms clumps and can no longer be distributed with a uniform thickness. Furthermore, additional energy is needed for the water present in the powder in order to melt the powder. However, this additional energy depends on the amount of bound water. This can lead to the fact that the powder completely melts in a locally dry region of a layer and the powder only partially melts in a locally moist region of the same layer. As a result of this, the layer is bonded to the preceding layer only in some regions. In the worst case, the partially manufactured component must be discarded.

SUMMARY OF THE INVENTION

Accordingly, the present invention is based on the object of presenting a powder build unit that deposits dry powder.

The invention relates to a powder build unit for a device for the additive manufacture of components, the powder build unit having at least one electric lead and at least one power source that is connected to the electric lead. The electric lead functions in this case as a powder distributor and as a heating element. This has the advantage that a so-called doctor blade is not required for the distribution of powder. Furthermore, the electric lead functioning as a heat source is in direct contact with the powder. In this way, the heat can be better introduced into the powder. As a result of the local introduction of heat, the temperature, for example, in a powder bed of an SLM, SLS, or EBM unit (EBM—electron beam melting) is raised. In the process, the residual moisture contained in the powder and due to water, in particular, evaporates before the powder particles are fused.

In an advantageous embodiment of the invention, the electric lead has a cavity. Preferably, the cavity of the electric lead can be filled with a cooling fluid. This offers the advantage that it is possible to regulate the temperature of the electric lead.

In another advantageous embodiment of the invention, the powder build unit has a cooling pump for circulating cooling fluid through the cavity, said cooling pump being in fluid communication with the cavity. This offers the advantage of being better able to dissipate the heat that is present in the lead. Furthermore, the electric lead can thereby be cooled very rapidly to room temperature. In an advantageous way, this offers the possibility of heating only certain regions of the powder bed.

In another advantageous embodiment of the invention, the electric lead is formed from a solid wire. This has the advantage that it is possible to apply high currents without melting the electric lead.

In another advantageous embodiment of the invention, the electric lead is rigid and/or flexible. Depending on its application, the electric lead can be designed to be flexible at the edges and rigid in the center, for example.

In another advantageous embodiment of the invention, the electric lead is coiled, with an insulation being arranged between two adjacent windings. Such a coil has the advantage of being able to operate as a roller mechanically and being able to generate more heat electrically. The insulation can be constituted of air, a ceramic, or a plastic.

In another advantageous embodiment of the invention, the power source generates a direct current and/or an alternating current. By means of the direct current, the electric lead is operated as a pure heating wire. In this way, everything in immediate proximity is heated. Therefore, when the powder is being distributed, if the electric lead is situated in the vicinity of the component that has already been built up, the mound of powder being pushed in front of the electric lead and the already built-up region of the component are heated. If, in contrast, an alternating current is applied to the electric lead, a magnetic alternating field is generated, so that an alternating current can be created by induction in the component that has already been built up. As a result of this, only the region of the component that has already been built up is heated. In the process, the powder remains uninfluenced, because its electrical resistance is too high. Therefore, no eddy current can build up in the powder. If, for example, two separated electric leads are used, it is possible to apply a direct current to one electric lead and an alternating current to the other electric lead. This offers the advantage of being able to heat the mound of powder via the direct current lead. The direct current lead can preheat the component somewhat when it passes it. The alternating current lead can then additionally introduce thermal energy into the component, without the mound of powder being heated too strongly. In general, the individual particles of powder require less thermal energy for melting than does the upper region of the component. As a result, it is possible to prevent the particles from melting already in the mound of powder. The moist powder need only be dried in order to ensure the flowability of the powder in the mound of powder.

In another advantageous embodiment of the invention, the electric lead is coiled around, in particular, a soft magnetic core. This has the advantage that the induction produced by the alternating current is greater. Soft magnetic materials are ferromagnetic materials that can be readily magnetized in a magnetic field. Such materials include, among others, iron, cobalt, and nickel.

The invention further relates to a device for the additive manufacture of components, the device having at least one component platform that can be lowered, at least one powder build unit according to the present invention for the deposition of at least one powder layer of a component material on at least one build-up zone of the component platform, with the powder build unit being movable in relation to the component platform. The device further comprises at least one radiation source for generating a high-energy beam, by means of which the powder layer can be melted and/or sintered locally in the region of the build-up zone to form a component layer.

In addition, the invention comprises a method for the additive manufacture of components, in particular by using the device according to the invention, with the powder deposition or build occurring in such a way that a powder build unit has an electric lead (22) and functions as a powder distributor and as a heating element.

In addition, the invention comprises the use of the powder build unit according to the invention or of the device according to the invention in a method for the additive manufacture of components.

Further advantageous embodiments of the invention are discussed in detail below.

BRIEF DESCRIPTION OF THE DRAWING FIGURES

Figure 2:
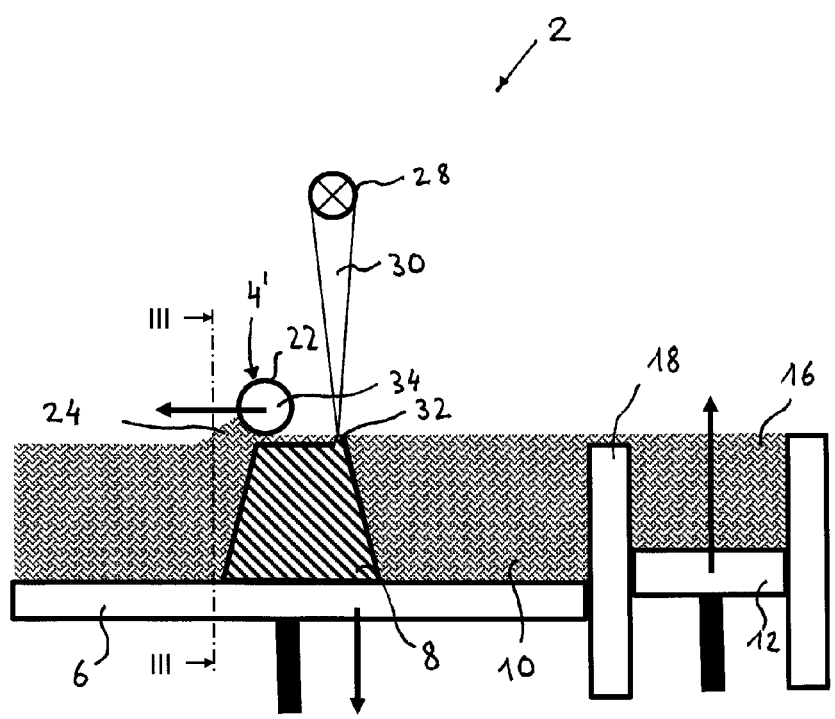
Figure 3:
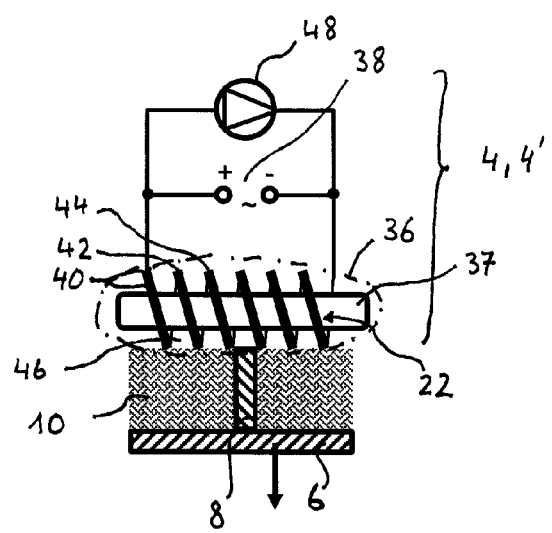

Preferred exemplary embodiments of the invention are described in detail below on the basis of the schematic drawings. Shown are:

FIG. 1 is a side view of an additive manufacturing device with a powder build unit according to the invention, FIG. 2 is a side view of an additive manufacturing device with a powder build unit according to the invention, FIG. 3 is a section along line III-III in FIG. 2.

DESCRIPTION OF THE INVENTION

FIG. 1 shows a side view of an additive manufacturing device 2 with a powder build unit 4 of the invention according to a first embodiment. FIG. 2 shows a side view of an additive manufacturing device with a powder build unit 4' of the invention according to a second embodiment. The device 2 has, on its bottom left side, a component platform 6 on which a partially manufactured component 8 is arranged and is embedded in a powder bed 10 of old powder 14. In this context, old means that the powder is already present in the powder bed 10. In this case, the word "old" gives no information about the age or about the quality of the powder. The device 2 has, on its bottom right side, a powder platform 12, on which new or fresh powder 16 is arranged. In this context, new means that the powder is not yet present in the powder bed 10. The two platforms 6 and 12 are separated from each other by a vertical intervening wall 18. For deposition of a new powder layer 20, the powder platform 12 is pushed a little upward first of all, so that the fresh powder 16 surmounts the intervening wall 18. The powder build unit 4 moves from right to left over the fresh powder 16, over the intervening wall 18, and over the powder bed 10. The powder build unit 4 has an electric lead 22. In the process, the electric lead 22 operates as a coater and pushes a mound of powder 24 in front of it and thereby distributes a new powder layer 20 uniformly on the component 8. In the first embodiment, the powder build unit 4 additionally has a doctor blade 26, which is arranged around the electric lead 22 (see FIG. 1). Or else, as depicted in FIG. 2, the electric lead 22 can come into direct contact with the mound of powder 24. Once a new powder layer 20 has been deposited on the component 8, this new powder layer 20 can be melted via a radiation source 28 arranged above the powder bed 10. In the process, a high-energy beam 30, such as, for example, a laser beam or an electron beam, impinges in a build-up zone 31 on the new powder layer 20. This powder layer 20 is caused to melt or to sinter and a new component layer 32 is formed. Once the manufacture of the new component layer 32 is finished, fresh powder 16 is deposited on the component 8, as mentioned above. The steps listed above are repeated until the component has been completely manufactured.

The electric lead 22 can be formed from a solid wire or else, as in this case, can have a cavity 34. This cavity 34 can be filled with a cooling fluid, such as, for example, water, helium, argon, and/or hydrogen.

FIG. 3 shows a section along the line III-III in FIG. 2. The component platform 6, on which the semifinished component 8 is arranged and is situated in the powder bed 10, can be seen at the bottom in FIG. 3. The powder build unit 4 or 4' is arranged directly above the powder bed 10. The powder build unit 4 or 4' has the electric lead 22, which is wound around a core 37 with six windings. The core 37 and the six windings form a coil 36. Thus, in FIG. 3, only the first winding 40, the second winding 42, and the third winding 44 are provided with reference numbers. Insulation 46 can be arranged between two adjacent windings. Here, air is used as insulation material. However, it needs to be pointed out that the bottom face of the coil 36 is closed, so that the powder in the mound of powder 24 can be distributed uniformly and smoothly. This coil 36 is connected to a power source 38. This power source 38 can generate both direct current and alternating current. If the electric lead 22 is hollow, then it can be connected additionally to a cooling pump 48. This pump 48 allows cooling fluid to flow through the hollow electric lead 22.

The functional operation of the powder build unit 4 or 4' according to the invention will now be explained in detail on the basis of FIGS. 1 and 2.

In FIG. 1, a direct current can be applied to the electric lead 22. In the process, the electric lead 22 becomes hot. This thermal energy of the electric lead 22 is delivered both to the mound of powder 24 and to the upper part of the component 8. The powder in the mound of powder 24 is dried in the process. The water present in the powder is evaporated. The temperature of the electric lead 22 can be regulated additionally by means of the cooling pump 48.

If, by contrast, the component 8 is only to be preheated, then an alternating current, which is supplied by the power source 38, can be applied to the electric lead 22. As soon as the powder build unit 4 or 4' is situated in the vicinity of the component 8, an alternating current is generated in the component 8 and the component 8 is correspondingly heated. The powder in the powder bed 10 has an electrical resistance that is too high for any alternating current to flow in it.

What is claimed is:

1. A powder build unit of an additive manufacturing device for the additive manufacture of components, comprising:
    a doctor blade configured and arranged to push a mound of powder to distribute a new powder layer uniformly within the additive manufacturing device;
    at least one electric lead disposed on the doctor blade, the electric lead having a cavity therein;
    at least one power source connected to the electric lead, the at least one power source configured and arranged to apply current to the electric lead, thereby heating the electric lead wherein water present in the mound of powder is evaporated; and a powder platform configured to push the new powder upwards above an intervening wall to create the new powder layer, wherein the cavity of the electric lead is filled with cooling fluid.

2. The powder build unit according to claim 1, wherein the powder build unit has a cooling pump, which is in fluid communication with the cavity, for circulating cooling fluid through the cavity.

3. The powder build unit according to claim 1, wherein the electric lead is a solid wire.

4. The powder build unit according to claim 1, wherein the electric lead is rigid or flexible.

5. The powder build unit according to claim 1, wherein the electric lead is wound in a coil, wherein an insulation is arranged between two adjacent windings.

6. The powder build unit according to claim 5, wherein the lead is wound around a soft magnetic core.

7. The powder build unit according to claim 1, wherein the power source generates a direct current and/or an alternating current.

8. An additive manufacturing device, comprising:
at least one component platform that can be lowered;
at least one powder build unit movable in relation to the component platform,
a powder platform configured to push a mound of powder upwards above an intervening wall;
the at least one powder build unit having at least one electric lead and being configured to push the mound of powder as the at least one powder build unit moves in relation to the component platform thereby distributing a new powder layer uniformly on at least one build up zone of the component platform, the at least one electric lead having a cavity therein;
at least one power source, which is connected to the electric lead and configured to apply current to the electric lead, thereby heating the electric lead wherein water present in the mound of powder is evaporated; and
at least one radiation source for generating a high-energy beam, by which the powder layer can be melted and/or sintered locally in a region of the build-up zone to form a component layer,
wherein the cavity of the electric lead is filled with cooling fluid.

9. The additive manufacturing device according to claim 8, wherein the powder build unit further comprises a doctor blade.

10. The additive manufacturing device according to claim 8, further comprising:
a cooling pump, which is in fluid communication with the cavity, for circulating cooling fluid through the cavity of the electric lead.

11. The additive manufacturing device according to claim 8, wherein the electric lead is a solid wire.

12. The additive manufacturing device according to claim 8, wherein the electric lead is wound in a coil, wherein an insulation is arranged between two adjacent windings.

13. The additive manufacturing device according to claim 12, wherein the lead is wound around a soft magnetic core.

14. The additive manufacturing device according to claim 8, wherein the power source generates a direct current.

15. The additive manufacturing device according to claim 8, wherein the power source generates an alternating current.

16. A powder build unit of an additive manufacturing device for the additive manufacture of components, comprising:
two electric leads disposed on a blade configured and arranged to push a mound of powder to distribute a new powder layer uniformly within the additive manufacturing device, the two electric leads having a cavity therein;
at least one power source connected to the two electric leads, the at least one power source configured and arranged to apply current to the two electric leads, thereby selectively heating at least one of the two electric leads,
wherein the at least one power source generates an alternating current in one of the two electric leads and direct current in the other of the two electric leads, and
wherein the cavity of the two electric leads is filled with cooling fluid.

* * * * *